United States Patent [19]

Isaac

[11] 3,989,568

[45] Nov. 2, 1976

[54] POLYURETHANE COVERED GOLF BALLS

[75] Inventor: Edward J. Isaac, Westport, Mass.

[73] Assignee: Acushnet Company, New Bedford, Mass.

[22] Filed: Nov. 21, 1974

[21] Appl. No.: 525,970

[52] U.S. Cl. .............................. 156/182; 156/146; 156/213; 156/214; 156/242; 156/250; 260/77.5 AM; 260/77.5 AT; 260/858; 264/271; 273/235 R; 428/425
[51] Int. Cl.² ........................................ B32B 31/04
[58] Field of Search .......... 156/214, 146, 222, 242, 156/250, 182; 264/271, 275, 54; 260/77.5 AT, 77.5 AM, 858; 273/235 R; 428/425

[56] References Cited
UNITED STATES PATENTS

| | | |
|---|---|---|
| 3,034,791 | 5/1962 | Gallagher .................. 260/77.5 AM |
| 3,130,102 | 4/1964 | Watson et al. ...................... 156/228 |
| 3,194,793 | 7/1965 | Kogon ......................... 260/77.5 AM |
| 3,645,924 | 2/1972 | Fobiel .......................... 260/77.5 AT |
| 3,674,721 | 7/1972 | Aufdermarsh et al. ....... 260/77.5 AT |

*Primary Examiner*—Edward G. Whitby
*Attorney, Agent, or Firm*—Eyre, Mann, Lucas & Just

[57] ABSTRACT

An improved process and resultant composition for covering golf balls with polyurethane is disclosed. Either the prepolymers or the curing agents are selected to have different rates of reaction so that a partial cure can be made to form a ball half shell whereafter the half shell can be disposed about the golf ball core and finished cured.

7 Claims, No Drawings

POLYURETHANE COVERED GOLF BALLS

The present invention relates to polyurethane covered golf balls and particularly to a process for making same which is commercially viable.

There has been much work recently in the field of golf balls covers to make them more durable and less expensive but still have good click and feel. One of the primary reasons for this is that the price of balata, the principle cover stock for golf balls, has recently become prohibitive except for the most high priced balls. Even for the high priced balls, the cost of balata is causing shrinking profits and substitutes are being sought.

One of the most popular substitute materials is a resin sold under the trademark Surlyn by Dupont. The advantage of the Surlyn material is that it is considerably less expensive than balata and has greater cut resistance thus being quite acceptable to "duffers." The disadvantage to the Surlyn resins is that they are lacking considerably in click and feel and are consistently disliked by professional golfers and the better amateur golfers.

One cover material which has been looked at as a substitute for balata or Surlyn resin is polyurethane. The great advantage to polyurethane is that it combines relatively low price with the good cut resistance of Surlyn resin and the good click and feel of balata. The disadvantage to polyurethane is that it is a thermosetting material and is very difficult to process as a golf ball cover.

Various attempts have been made to use thermosetting polyurethane resins for golf ball covers. To date, however, none of these has been commercially viable. By this it is meant that the covers can be made but it is a very involved procedure and cannot be used in a commercial production line. For example, U.S. Pat. No. 3,130,102 discloses a process for making a ball half shell by partially curing a polyurethane prepolymer and then interrupting the cure by cooling the half shell. A single prepolymer and curing agent are used. While this process may be viable in the laboratory it is very difficult, if not impossible, to use on a large scale basis since it is extremely difficult to stop a reaction in the middle by freezing at exactly the same point each time. If there are permitted to be differences in the point of freezing, then the golf balls formed will have varying properties, a highly undesirable result.

In accordance with the present invention, there is disclosed a new and useful process for making golf ball covers and compositions for effecting the same. The process comprises using materials having varying reaction rates so that one reaction can be carried to substantial completion in forming the cover half shell and then a second reaction can be carried out to cure the cover about the golf ball core. Variation of the reaction rates is effected by using at least a three reactant system. For example, two polyurethane prepolymers can be used with a single curing agent or one polyurethane prepolymer can be used with two curing agents. It will be understood that the minimum number of reactants is three. There is no maximum other than practical considerations. For example, one could use a mixture of two polyurethane prepolymers with a mixture of two curing agents if desirable. Alternatively, one might use three polyurethane prepolymers with a single curing agent or a single polyurethane prepolymer with three or more curing agents. The essential feature is that the rates of reaction are different. For example, if polyurethane prepolymer A is used with curing agents B and C then the rate of reaction of curing agent B with polyurethane prepolymer A must be different from the rate of reaction of curing agent C with polyurethane prepolymer A.

The particular polyurethane prepolymers and curing agents selected are not critical so long as a selection is made which results in components having at least two different rates of reaction. With respect to the prepolymer, it is possible to use any two diisocyanates which have different rates of reaction with the selected curing agent. However, we much prefer, where a multiple prepolymer system is used, to have at least one aromatic diisocyanate and one aliphatic diisocyanate. The reason for this is that the aromatic diisocyanate will have a rate of reaction which is much greater (order of magnitude up to 100 times or even higher) than the aliphatic diisocyanate no matter what is selected as the curing agent. With respect to the curing agent for the multiple prepolymer system, any curing agent can be used which will cure each of the prepolymers.

Where a multiple curing agent system is used, it is necessary to select curing agents which have different rates of reaction with respect to the prepolymer system employed. Generally only a single prepolymer will be used although it will be understood that mixtures of prepolymers may be employed if desired. It is generally true that no matter what prepolymer is employed, the rates of reaction of the following typical curing agents will be in the order shown with the fastest being listed first and the slowest being listed last:

| TYPES OF CURING AGENT | EXAMPLE |
| --- | --- |
| unhindered amine, preferably aromatic | methylene dianiline (MDA) |
| hindered amine | 5,5' methylene-bis-(methyl anthranilate) |
| primary polyol | 1,5-butanediol |
| secondary polyol | 2,3-butanediol |
| tertiary polyol | 2,3-dimethyl-2,3-butanediol |
| aromatic polyol | hydroquinone |

One skilled in the art will, of course, recognize that any one of the above may be moved down on the list by slowing the reaction rate such as by steric or electronic hindrance as for example by adding a halogen atom in the ortho position to the amine group in an aromatic amine curing agent.

Similarly, one could vary reaction rates by "blocking" any of the above compounds so that it only reacts above a specified temperature. For example, Caytur, a blocked methylene dianiline available from DuPont, will only react at temperatures above 220° F. Thus straight methylene dianiline can be used as the fast curing agent and blocked methylene dianiline can be used as the slow curing agent. The first reaction with the straight methylene diamine would be controlled at below suitably 200° F and then the second reaction would be carried out at temperatures above 220° F.

It is also possible in a multiple curing agent system to select two of the same types of curing agents, e.g., two primary polyols having different reaction rates, but it is much preferred to select the curing agents from at least two different groups since there will then be obtained a greater difference in rate of reaction.

It is further possible to incorporate the two different curing agents into a single compound. A typical example of such a compound would be a difunctional compound wherein one of the functional groups is from one of the curing agent classes and the other functional group is from the other curing agent class, e.g., a compound which is both amino and hydroxy substituted.

In carrying out the present invention, the at least three selected reactants (two prepolymers and one curing agent or one prepolymer and two curing agents) are preferably admixed at elevated temperatures, poured into a slab and then the initial reaction (the faster of the two reactions) is allowed to go to substantial completion. This can take from under 1 minute up to 48 hours or more depending upon the particular components and temperatures selected. If the two components are different enough in reaction rates, then their processing can be carried out without any intermediate steps. If, on the other hand, the reaction rates are quite close, then it is desirable to freeze the slabbed composition after substantial completion of the first reaction in order to prevent the second reaction from progressing unduly before processing can be completed.

The slabbed material, whether frozen or not, is preferably cut into blanks of approximately 1 inch by 1 inch after which a cover half shell is formed by compression molding in known manner. Enough heat and time are used to give a half shell that will hold its shape. The half shell is then removed from the mold (with cooling of the mold if necessary) after which it is either immediately molded about a ball or stored for future use. Depending upon the particular reactants selected, the half shell can be maintained at ambient temperature for up to 48 or more hours. Alternatively, if the half shell is not to be molded about a ball within the time that the second reaction (the slower reaction) would unduly progress, then the half shell can be frozen for later use.

When used, two half shells are placed about a golf ball core in known manner and the cover is then compression molded about the core. This final compression molding step, which is well known in the art, bonds the two half shells together and also results in formation of dimples in the cover due to the fact that the molds employed have dimple negatives. It is not necessary that the second reaction be carried to completion during this final molding process. Quite the contrary, it is only necessary that the final molding be of sufficient heat and time to adhere the two half shells to each other and to impress the dimples. Thereafter, the balls can be removed from the mold and be post cured, either at ambient or elevated temperature, until the second reaction goes to substantial completion. While this is the preferred process of the present invention, it will be understood that the final cure could be carried out to completion in the golf ball mold if desired.

The core used with the golf ball of the present invention may be any core which is suitable for use in a golf ball. It may be a solid core such as the composition disclosed in U.S. Pat. No. 3,791,655 or it may be a standard wound cure. One of the great advantages of polyurethane covers made in accordance with the instant invention is that they may be made very thin which is highly desirable both from a cost point of view and a golfing point of view. Because of USGA regulations, virtually all golf balls made in the United States (except those for export) have a diameter of about 1.68 inches. With the cover composition of the present invention, the core may be made up to about 1.63 inches, leaving a cover of approximately 0.025 inches in thickness. There is no limitation on how thick the cover of the present invention may be but it is generally preferred to have a core of at least 0.5 inches in diameter so that the cover is no more than about 0.6 inches in thickness.

The following examples illustrate the present invention:

EXAMPLE 1

This example demonstrates the present invention using a multiple prepolymer system with a single curing agent. Urethane prepolymer LD-2832 was used as the fast reacting urethane prepolymer. This prepolymer is a polyether aromatic diisocyanate with an available NCO content of 4.5% and is available from DuPont. 30 parts by weight of this prepolymer were employed.

Urethane prepolymer LW-520 was used as the slow reacting urethane prepolymer. This prepolymer is an aliphatic diisocyanate having an available NCO content of 4.5% and is also available from DuPont. 70 parts by weight of this prepolymer were employed.

As the curing agent for this system, there can be employed any of the various known urethane curing agents such as MOGA (3,3' dichloro 4,4' diamino diphenyl methane), a diol, triol, tetraol, triamine, etc. The actual curing agent employed was methylene dianiline (MDA) and it was used in the amount of 14 parts.

While the specific example employed was for illustrative purposes and used only the two prepolymers and the single curing agent as set forth hereinbefore, it will be understood that other ingredients could be included in the cover material such as catalysts, colorants, ultraviolet light absorbers, plasticizers, mold release agents, fillers, water scavengers, reinforcing agents, etc. For example, the inclusion of up to about 10% by weight of titanium dioxide is preferred since it imparts good color to the ball.

The selected parts of aromatic and aliphatic diisocyanates should be such as to permit further molding processing after completion of the initial reaction while at the same time allowing the stock to be mixed before the initial reaction. It is pointed out in this regard that some materials react so rapidly that they prevent effective mixing of the ingredients. Generally there should be employed from about 5 to about 95% of the aromatic diisocyanate with from about 95% to about 5% of the aliphatic diisocyanate.

The selected ingredients were heated at about 215° F. and were then degassed. Thereafter, the ingredients were combined and mixed for about 5 minutes employing an air driven mixer. The admixture was poured out into a slab of approximately 0.25 inches in thickness and the initial reaction of methylene dianiline with urethane prepolymer LD-2832 was permitted to go substantially to completion. This took approximately 20 minutes. Thereafter, the sheet was frozen to below 0° F. to substantially prevent the reaction of the curing agent with the LW-520. Blanks of approximately 1 inch by 1 inch were cut and were compression molded in known manner to form golf ball half shells. A temperature of 100° C. was employed and a molding time of 1 minute was used. This was found to be sufficient to give a half shell that would hold its shape, which is the necessary requirement of this step. The mold was cooled with ice water of approximately 32° F. and the half shells were released. Thereafter, the half shells were frozen for storage. A series of golf balls were subsequently made by in each case placing two half shells in a golf ball mold with a standard wound core of about 1.63 inches in diameter placed therebetween. The half shells were compression molded about the core at 260° F. for 5½ minutes. This was found sufficient to join the two half shells to each other and to impress the dimples in the cover. Depending upon the particular prepolymers and curing agents employed, the curing temperature can be from about 180° to 310° F. for a period of from about 1 minute to about 24 hours. After molding in the golf ball mold, the balls were removed from the mold and allowed to post cure at ambient temperature for 2 weeks.

The thus formed golf balls were compared to a high grade wound ball having a balata cover and to a high grade wound ball having a Surlyn cover. The balls were found to have cut resistance comparable to the Surlyn covered balls and were found to have even greater abrasion resistance than the Surlyn covered balls. While having these very good cut resistance and abrasion characteristics the balls also had click and feel properties which were comparable to those of the balata covered ball. When driven with a wood type golf club, the feel was found to be virtually identical to that of a balata covered ball while the click was found to be equal to or better than the click of the balata covered ball.

EXAMPLE 2

This example demonstrates the use of multiple curing agents with a single urethane prepolymer.

The urethane prepolymer employed was LW-520, an aliphatic diisocyanate available from DuPont. It will be understood that while a single aliphatic prepolymer was employed, a mixture of prepolymers could be employed. As the fast curing agent there as employed methylene dianiline at 60% of theory. This worked out to about nine parts per 100 parts of LW-520 prepolymer. Methylene dianiline is an unhindered amine-type curing agent.

Curene 158 was used as the slow curing agent. Curene 158 is a hindered amine, more particularly 5,5'-methylene bis(methyl anthranilate) available from Anderson Development Company. 35% of theory of Curene 158 was employed which worked out to about six parts by weight. Because the reaction between the selected curing agents and the selected prepolymer is quite slow, one part of stannous octoate was also used in the formulation as a catalyst.

The ingredients were melted, degassed and mixed as in the previous example whereafter they were poured into a slab of approximately 0.25 inches in thickness and allowed to stand for 1 hour at ambient temperature to permit the first reaction, i.e., the reaction between methylene dianiline and urethane prepolymer LW-520 to go to substantial completion. Since the secondary reaction, i.e., the reaction between Curene 158 and urethane prepolymer LW-520 is such a slow reaction as compared to the primary reaction, it is not necessary to employ any cooling or freezing steps with this composition unless it is desired to store it for more than 48 hours. One inch by one inch squares were cut from the stock and golf ball half shells were made by compression molding the cut pieces at 100° C. for 2 minutes. The mold was cooled for demolding the half shells whereafter the half shells were suitable for use in making a golf ball cover. A number of golf balls were made up in standard manner in each of which two half shells were compression molded about a standard golf ball core of about 1.63 inches in diameter. The covers were compression molded at about 240° F. for a 5½ minute cycle. Thereafter, the balls were removed and allowed to post cure for at least 2 weeks and preferably 2 months. It was noted that in removing these balls from the molding machine they were quite soft and care had to be taken in handling them. This can be readily overcome by increasing the cure cycle to, for example, 10 – 12 minutes. Balls made in accordance with this example were compared to both Surlyn covered balls and balata covered balls. As in the previous example, the balls were found to have cut resistance as good as the Surlyn covered balls and abrasion resistance greater than the Surlyn covered balls while at the same time having the good click and feel of balata covered balls.

It will be understood that the claims are intended to cover all changes and modifications of the preferred embodiments of the invention, herein chosen for the purpose of illustration, which do not constitute departures from the spirit and scope of the invention.

What is claimed is:

1. A process for preparing a golf ball comprising a core and a cover surrounding said core, comprising at least one polyurethane prepolymer and at least one curing agent which will cure said prepolymer together with a third reactant selected from the group consisting of urethane prepolymers curable by said curing agent at a reaction rate different from the reaction rate of the curing agent with said at least one urethane prepolymer and curing agents which will cure said at least one urethane prepolymer at a different rate than the rate of cure of said at least one polyurethane prepolymer by said at least one curing agent comprising:
    a. admixing said at least one polyurethane prepolymer said at least one curing agent and said third reactant;
    b. pouring said admixture to form a slab;
    c. permitting the faster reaction between the said at least one polyurethane prepolymer, the said at least one curing agent and the said third reactant to go to substantial completion;
    d. cutting the partially cured slab into half shell blanks;
    e. forming a golf ball half shell;
    f. placing at least two of such golf ball half shells about a golf ball core; and
    g. further curing said golf ball half shells about said golf ball core by effecting reaction of the slower reactants of said at least one polyurethane prepolymer, said at least one curing agent and said third reactant.

2. A process for preparing a golf ball comprising a core and a cover surrounding said core, said cover comprising at least two urethane prepolymers and at least one curing agent which will cure each of said urethane prepolymers, the rate of reaction of the curing agent with one of said urethane prepolymers being different from the rate of reaction of said curing agent with the other of said urethane prepolymers comprising:
    a. admixing said at least two urethane prepolymers with said at least one curing agent;
    b. pouring said admixture to form a slab;
    c. permitting the faster reaction between the curing agent and at least one of said urethane prepolymers to go to substantial completion;
    d. cutting the partially cured slab into half shell blanks;

e. forming a golf ball half shell;

f. placing at least two of such golf ball half shells about a golf ball core; and g. further curing said golf ball half shells about said golf ball core by effecting reaction between said at least one curing agent and the other of said urethane prepolymers.

3. The process of claim 2 wherein one of said urethane prepolymers is an aromatic diisocyanate and the other of said urethane prepolymers is an aliphatic diisocyanate.

4. The process of claim 2 wherein the curing agent is selected from the group consisting of difunctional, trifunctional and tetrafunctional polyols and amine-type curing agents having at least two reactive sites.

5. A process for preparing a golf ball comprising a core and a cover surrounding said core, said cover comprising a urethane prepolymer and at least two curing agents which will cure said urethane prepolymer, the reaction rate between one of said curing agents and said prepolymer being faster than the reaction rate of the other of said curing agents and said prepolymer comprising:

a. admixing said urethane prepolymer and said at least two curing agents;

b. pouring said admixture to form a slab;

c. permitting the faster reaction between the urethane prepolymer and at least one of said curing agents to go to substantial completion;

d. cutting the partially cured slab into half shell blanks;

e. forming a golf ball half shell;

f. placing at least two of such golf ball half shells about a golf ball core; and g. further curing said golf ball half shells about said golf ball core by effecting a reaction between said urethane prepolymer and the other of said at least two curing agents.

6. The process of claim 5 wherein the curing agents are selected from the group consisting of:
unhindered amines,
hindered amines,
primary polyols,
secondary polyols,
tertiary polyols,
aromatic polyols, and
hindered aromatic polyols,
one of aid curing agents being from one of the aforementioned groups and at least one of said curing agents being from another of said aforementioned groups.

7. The process of claim 5 wherein at least two of said at least curing agents are present in a single compound.

* * * * *